Feb. 21, 1967  J. AMEEN  3,305,492
ETHYLENE OXIDATION CATALYST COMPOSITION COMPRISING
SILVER ON ALPHA-ALUMINA
Original Filed Aug. 4, 1960
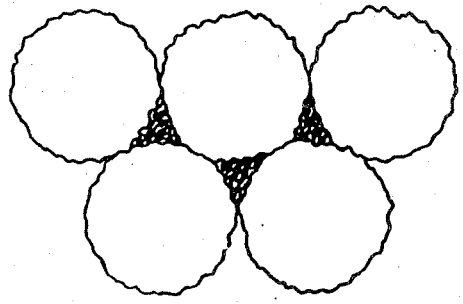
SUPPORT FROM UNIFORM RELATIVELY
LARGE PARTICLES
FIG.I.
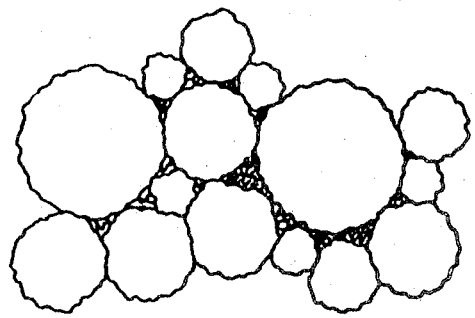
SUPPORT FROM NONUNIFORM PARTICLES
FIG.2.
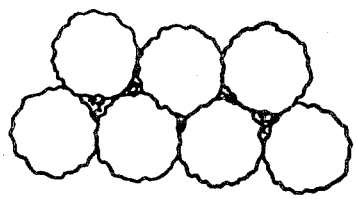
SUPPORT FROM UNIFORM RELATIVELY
SMALL PARTICLES
FIG.3.
INVENTOR.
JAMEIL AMEEN
BY
ATTORNEY 3,305,492
ETHYLENE OXIDATION CATALYST COMPOSITION COMPRISING SILVER ON ALPHA-ALUMINA
Jameil Ameen, Hopewell, Va., assignor to Allied Chemical Corporation, New York, N.Y., a corporation of New York
Original application Aug. 4, 1960, Ser. No. 46,619, now Patent No. 3,172,893, dated Mar. 9, 1965. Divided and this application June 12, 1964, Ser. No. 374,658
4 Claims. (Cl. 252—463)

This application is a division of our co-pending application Serial No. 46,619, filed August 4, 1960, now United States Patent No. 3,172,893.

This invention relates to the oxidation of ethylene to ethylene oxide and more particularly to an improved catalyst for use in catalyzing the direct oxidation of ethylene oxide at superatmospheric pressure.

The conversion of ethylene with oxygen is conventionally carried out in a multitube reactor consisting of a plurality of parallel thin wall tubes about 10 to 25 feet long and about 1 to 2 inches in diameter, which tubes are filled with pellets of a supported silver catalyst through which the gaseous reactants, ethylene and oxygen with an inert gaseous medium, are passed, and which tubes are supported by a liquid bath for extracting the exothermic heat of reaction and regulating the temperature of the reaction. The process is commonly carried out at superatmospheric pressure above 100 p.s.i.g., more generally within the range of 150 to 300 p.s.i.g., with low pressure operation generally considered employing pressure below 100 p.s.i.g.

Although the production of ethylene oxide by direct oxidation of ethylene is and has been commercially practiced for some time, it is nevertheless subject to serious disadvantages. This is perhaps best indicated by the fact that the cost to produce ethylene oxide is relatively high compared to the cost of the reactants. One reason for this is that the normal ethylene and oxygen content in the reaction gases passing through the catalyst bed are about 4.5% and about 5.5% respectively, the balance an inert gaseous medium, generally nitrogen from the air used to supply oxygen. Appreciable increase in the concentration of ethylene and oxygen in the reactant gases cannot be tolerated primarily because of the explosive nature of the reaction mixture at higher concentrations. The throughput expressed in terms of space velocity—volume of gas entering reactor per volume of catalyst in reactor—which defines in great measure the amount of productivity from a unit of given size representing capital investment and also operating charges is relatively low, below 10,000 hrs.$^{-1}$. A material increase in space-time yield—pounds ethylene oxide per hour per cubic foot catalyst—represents a substantial saving in investment and operating expense, and although highly desirable, is not readily achieved. Another limiting factor in the process is that only moderate amounts, of the order of about 15–40%, of the reactants are reactively attacked during the process. A further disadvantage is that a good portion, often about 20–40%, of the ethylene attacked oxidizes completely to form carbon dioxide and water vapor rather than ethylene oxide. Consequently, the efficiency—mols ethylene oxide per 100 mols ethylene attacked—for the ethylene oxidation process rarely exceeds about 70% during normal use, and is more generally within the range of 50–65%. Yields—mols ethylene oxide per 100 mols ethylene entering the reactor—are generally as low as 12–22%. The production of ethylene oxide by direct oxidation of ethylene is therefore the type of process in which, so far, no more than about 1% of the reactant gases entering the process are present as sought-for ethylene oxide product in the gases exiting the ractor. Consequently, large amounts of gaseous reactants are recycled in the process, requiring large and expensive plant equipment to achieve such recycling and for the separation and recovery of ethylene oxide product and for the removal of waste carbon dioxide and water. It is evident that the smallest increase say of one-tenth of one percent in the amount of gases charged to the reactor which form ethylene oxide will result, in such case, in a 10% increase in production and effect substantial savings in both operating costs and capital equipment. To this end, because the concentration of the reactants is limited by safety requirements, much attention is given to the matter of activity and selectivity of the catalyst used in the process. A catalyst which is highly active and causes reaction of a substantial part of the ethylene and oxygen passing in contact with it is of course highly desirable. However, an increase in the amount of ethylene attacked by a particular catalyst without an increase in efficiency may not be as desirable as an increase in efficiency alone. The catalyst should be highly selective in that it should convert the ethylene to ethylene oxide with a minimum amount of carbon dioxide formation. The art has striven in the direction of improving the activity and selectivity of the catalyst and to some extent has achieved improvement in that direction. Unfortunately, the benefits of the more active catalysts could not be realized because of operational difficulties inherent in superatmospheric pressure operation, particularly with respect to "hot-spotting" with "short life" of catalyst necessitating frequent shut-downs, expensive catalyst replacement, and additional high labor costs.

The catalyst for oxidizing ethylene to ethylene oxide is a support coated with silver. The supporting material is an important factor in the catalyst, directly affecting the utility and activity of the catalyst. For example, alpha alumina is a good support whereas beta and gamma aluminas are useless. U.S. Patent No. 2,901,441 to W. W. Waterman discloses that alpha alumina and silicon carbides having an average porosity of 35–65%, are useful carriers. Theoretically, a more active silver catalyst should result with the use of a highly porous support. In practice, however, we have found that with such porous catalyst, particularly under high pressure operation, high productivity rates, i.e. yield of ethylene oxide from a given amount of ethylene fed to the overall process, cannot be obtained without a marked loss in efficiency during extended use. "Hot-spotting" occurs creating such intense heat that selectivity, and eventually activity, are seriously depreciated.

An object of the present invention is to provide an improved silver catalyst for the direct oxidation of ethylene to ethylene oxide.

Another object is to provide a catalyst for converting ethylene to ethylene oxide to produce increased quantities of ethylene oxide without material loss of selectivity and activity of the catalyst.

A further object is to provide a catalyst for the oxidation of ethylene to ethylene oxide which will retain increased efficiency for extended periods during high pressure operation.

These and other objects and advantages will be apparent from the following description and accompanying drawing.

The present invention involves the discovery that the silver-catalyst-alpha alumina support system when prepared in a certain way results in an unexpected and substantial increase in efficiency over the same type catalyst system as known in the art. Specifically, it has been found that the pore diameter of porous alpha alumina has a direct effect upon the efficiency and productivity of the catalyst. So far as it is known, the prior art catalysts made from commercially available alumina have varying degrees of porosity which may be as much as 65% with a large number of small pores averaging in diameter about 2–30 microns. According to the present invention, the number of pores is considerably reduced and the remaining pores enlarged to diameters within the range of about 80–200 microns, preferably 100–150 microns, while maintaining a relatively high porosity of about 40–50 percent. Promoted silver catalyst supported on the surface and throughout the pores of alpha alumina having the above specification substantially increases the efficiency of the silver catalyst and is effective at superatmospheric pressure to provide high productivity of ethylene oxide. Specifically, the catalyst permits sustained efficiency of over 60 percent at production rates greater than 18 pounds of ethylene oxide per hour per cubic foot of catalyst. The catalyst has the further advantage of an unusually long life and can be economically produced for commercial use. No exact reason can be given with assurance for the advantages achieved by the catalyst of this invention. However, it is theorized that the presence of large pores in the catalyst is important, particularly in superatmospheric pressure operation, to permit more rapid removal of reaction heat by free passage of gas through the catalyst. This is perhaps best evident from the fact that the catalyst has an unusually long life, indicating a further advantage that the catalyst substantially reduces the tendency to "hot spot" and destroy catalytic activity.

In accordance with the invention, a highly active and selective silver catalyst is prepared by providing alpha alumina support material, usually in the form of spheres or pellets, such supporting material having a porosity of about 40–50 percent and pore diameters within the range of about 80–200 microns, preferably 100–150 microns, and formed by bonding a plurality of alpha alumina particles having diameters within the range of about 400–600 microns, preferably 450–550 microns. The alumina support is impregnated with a promoted silver oxide slurry and dried at a suitable temperature. A highly efficient silver catalyst is then activated by heating the dried, impregnated alumina to a temperature of about 300–400° C.

In detail, the silver oxide slurry is preferably prepared by precipitation from an aqueous solution of a silver salt and water soluble hydroxide which can be completely washed from the precipitated silver oxide. Although various combinations are of course possible the silver salt is preferably the nitrate and the hydroxide preferably sodium hydroxide. After precipitation the silver oxide is separated from the mother liquid by suitable means such as decantation and then carefully washed with demineralized or distilled water to remove residual sodium compounds. The silver oxide is allowed to settle and sufficient supernatant liquid drawn off to leave an aqueous slurry to which if desired, a catalyst promoter can then be added. In the preferred embodiment barium lactate is added as a catalyst promoter, generally in amount about 5 to 25 percent, preferably 13 to 16 percent based on the weight of silver oxide. The promoter is preferably added as an aqueous solution containing about 60 percent barium lactate which may be conveniently prepared by mixing about 60 parts by weight barium hydroxide octahydrate with about 40 parts by weight 85 percent lactic acid. Although barium lactate is preferred, other catalyst promoters may be used such as calcium acetate, calcium lactate, and barium hydroxide.

The promoted silver oxide slurry containing about 14 to 26 percent, preferably 18 to 22 percent silver oxide is then deposited on the alumina support in such a manner that the slurry is evenly distributed on the entire outer surface and throughout the pores of the alumina. This is desirably accomplished by placing the alpha alumina in a rotable drum and tumbling into a spray of silver oxide slurry. Sufficient silver oxide should be sprayed to produce a catalyst having between about 12 to 17 weight percent silver. The alpha alumina support impregnated with promoted silver oxide slurry is then dried at a temperature below about 130° C., preferably 90–100° C., and the catalyst activated by heating to a temperature of about 300–400° C. so as to decompose silver oxide and deposit elemental active silver on the surface and throughout the pores of the alpha alumina. Activation of the catalyst is effected at a uniform temperature, desirably a temperature which does not vary more than 40° C., preferably not more than 5° C. during any one heating operation. Although silver oxide has been described as the preferred source of active silver it will be understood that other suitable decomposable silver compounds may be used, including but not limited to such compounds as silver lactate, silver carbonate, and silver acetate.

The alpha alumina catalyst support used in the present invention will be further described in detail with reference to the accompanying drawing in which diagrammatically:

FIG. 1 represents the catalyst support of the present invention having large pore spaces formed from large, relatively uniform, roughly spherical particles.

FIG. 2 represents a support having small pore spaces resulting from the orientation of roughly spherical particles, of non-uniform size.

FIG. 3 represents a support having small pore spaces formed from uniform but relatively small particles.

Referring to the drawing, FIG. 1 shows the catalyst support of the present invention comprising a plurality of fused relatively uniform roughly spherical particles having diameters of about 400–600 microns with pore diameters about 80–200 microns, preferably 100–150 microns. The support having the above specification will have a porosity of about 40–50 percent. It is critical to the present invention that particles forming the support not only have the required diameter but also be relatively uniform in size. As a general proposition high porosity is not related to pore size, a plurality of small pore spaces accumulating to give a system having high porosity. When particles are not relatively uniform, pore diameter is reduced because smaller particles fill the voids between larger particles, substantially as shown in FIG. 2. Even if particles are relatively uniform as shown in FIG. 3, smaller diameter particles will not form a system having the required pore size. Consequently, particles used in forming the support of the present invention must have relatively uniform diameters within the range of about 400–600 microns, preferably 450–550 microns.

The individual alpha alumina particles are formed into catalyst spheres or pellets of desired size, which may be as large as ¼–½" in diameter, being generally no larger than one-half the diameter of the reaction tube. In the procedure found most suitable, particles of relatively uniform size having diameters within the range of about 400–600 microns, preferably 450–550 microns, are mixed with 15 to 35 percent, preferably 20 to 30 percent by total mixture weight of a bonding material prepared by mixing glycerin with a suitable clay material such as ball clay or kaolin. The preferred glycerin mix contains about 50 percent kaolin and is prepared by mixing about 1 part by weight glycerin with 1 part kaolin. The mixture of alumina particles and bonding material is then placed in a mold and pressed or tamped into the desired shape. The aggregates thus formed are then permanently set into roughly spherical shapes by firing in a kiln to a temperature of about 1350° C. to 1900° C. preferably 1650° C. to 1900° C. Modified procedures may employ a bonding material such as finely divided silica or feldspar or shape the mixture of alumina and bonding material by subjecting to the motion of a rotating drum or vibrating surface by which action the particulate material is caused to cohere or agglomerate into roughly spherical shapes of substantially uniform size. The individual spheres produced in the above manner will have a porosity of about 40–50 percent with pore diameters within the range of 80–200 microns and are eminently suited for support of highly active and selective silver catalyst which may be deposited on the support by the procedure outlined above.

The following examples, in which percentages are by weight unless otherwise indicated illustrate the practice and advantages of the present invention.

Example A shows the preparation of a catalyst of the present invention having large pore diameters and Example B the preparation of a catalyst having the same porosity but small pore diameters. Examples 1 and 2 contrast the results obtained in ethylene oxidation using the catalyst prepared in Examples A and B, respectively.

EXAMPLE A

A 4.8% aqueous solution of sodium hydroxide containing 40.5 pounds of sodium hydroxide was slowly added with vigorous stirring to a 15.9% aqueous solution of silver nitrate containing 153.5 pounds of silver nitrate. The resulting silver oxide precipitate was thoroughly washed with demineralized water until all sodium compounds were removed. The silver oxide was then allowed to settle and the natant liquor siphoned off. The resulting silver oxide slurry contained about 21 weight percent silver oxide and 79 weight percent water. An aqueous solution containing 59 weight percent barium lactate promoter was prepared by mixing 17.9 pounds of $Ba(OH)_2 \cdot 8H_2O$ and 12.55 pounds of 85% lactic acid. The barium lactate solution was then immediately added to the silver oxide slurry, the resulting promoted silver oxide slurry containing about 20 weight percent silver oxide, 3.4 weight percent barium lactate and 76.6 weight percent water. 2700 cc. of 5/16" alpha alumina spheres was prepared by mixing 4 pounds of kaolin in 4 pounds of glycerin and thoroughly mixing this material with 20 pounds of roughly spherical alpha alumina particles having diameters between 450 and 550 microns and charging the mixture to a mold where it was shaped into spheres by pressing. Spheres measuring about 5/16" in diameter were removed from the mold and heated to a temperature of 1700° C. to fuse the points of contact between the particles. Porosity and pore diameters of randomly selected spheres were then determined. Porosity was found to be 43% with pore diameters averaging about 100 microns. The alumina spheres were then charged to a rotable drum and heated to a temperature of 94° C. The drum was slowly rotated at a speed of 22 r.p.m. and the tumbling spheres sprayed with the previously prepared promoted silver oxide slurry until the slurry was deposited on the surface and throughout the pores of the alumina spheres. The spheres impregnataed with the silver oxide slurry were transferred from the coating drum to an oven and dried at a temperature of 85–110° C. for 4 hours. Catalyst was then activated by heating the coated spheres at a uniform temperature of 360° C.

EXAMPLE B 2700 cc. of 5/16" alpha alumina spheres was prepared by mixing 4 pounds of kaolin in 4 pounds of glycerin and thoroughly mixing this material with 20 pounds of finely divided commercial alpha lumina particles having diameters between 20 and 80 microns and charging the mixture to a mold where it was shaped into spheres by pressing. Spheres measuring about 5/16" in diameter were removed from the mold and heated to a temperature of 1700° C. to fuse the points of contact between the particles. Porosity and pore diameters of randomly selected spheres were then determined. Porosity was found to be 43% with pore diameters averaging about 20 microns. The alumina spheres then were charged to a rotatable drum and heated to a temperature of 94° C. The drum was slowly rotated at a speed of 22 r.p.m. and the tumbling spheres sprayed with the promoted silver oxide slurry prepared as in Example A until the slurry was deposited on the surface and throughout the pores of the alumina spheres. The spheres impregnated with the silver oxide slurry were transferred from the coating drum to an oven and dried at a temperature of 85–110° C. for 4 hours. Catalyst was then activated by heating the coated spheres at a uniform temperature of 360° C.

EXAMPLE 1

A single tube reactor, type 430 Stainless Steel, having a length of 23' 7" and an outside diameter of 1⅛", 14 B.W.G., was charged to a depth of 17' with 2200 cc. of the catalyst prepared in Example A. The tube was jacketed with a pipe to contain tetralin bath and an immersion heater was used to heat the tetralin to boiling. The temperature of the boiling tetralin was controlled by regulating pressure over the bath. The ethylene oxidation reactor was brought up to a pressure of 236 p.s.i.g. at a 280° C. bath temperature using a typical recycle gas containing 4.4% ethylene, 5.4% oxygen, 8% carbon dioxide, 82.2% nitrogen and 0.5 p.p.m. ethylene chloride inhibitor. The flow rate was maintained at 18 c.f.m. (S.T.P.) and after 345 hours catalyst efficiency was 64.8% and yield 24.1%. Of particular importance also was the fact that space-time yield (productivity) obtained under the conditions of operation was an unexpectedly high 18.4 lbs. of ethylene oxide/hr./cu. ft. of catalyst.

EXAMPLE 2

A single tube reactor, type 430 Stainless Steel, having a length of 23' 7" and an outside diameter of 1⅛", 14 B.W.G., was charged to a depth of 17' with 2200 cc. of the catalyst prepared in Exmple B. The tube was jacketed with a pipe to contain tetralin bath and an immersion heater was used to heat the tetralin to boiling. The temperature of the boiling tetralin was controlled by regulating pressure over the bath. The ethylene oxidation reactor was brought up to a pressure of 239 p.s.i.g. at a 290° C. bath temperature using a typical recycle gas containing 4.4% ethylene, 5.4% oxygen, 7.7% carbon dioxide, 82.5% nitrogen and 0.5 p.p.m. ethylene chloride inhibitor. The flow rate was maintained at 18 c.f.m. (S.T.P.) and after 236 hours catalyst efficiency had depreciated to 55.3% with yield 21.9%. The productivity of this catalyst was only 16.7 lbs. ethylene oxide/hr./cu. ft.

Although various embodiments of the invention have been disclosed for purpose of illustration, it will be evident that various changes and modifications may be made therein without departing from the scope and spirit of the invention.

I claim:

1. A catalyst adapted for catalytically oxidizing ethylene to ethylene oxide consisting essentially of activated elemental silver on a support of a plurality of bonded relatively uniform alpha alumina particles, said particles having diameters of about 400 to 600 microns, said support having pore diameters within the range of from 80 to 200 microns and a porosity of from about 40 to 50 percent, said catalyst having a silver content of from about 12 to 17 weight percent.

2. A catalyst according to claim 1, wherein the alpha alumina particles have diameters within the range of about 450 to 550 microns and said support has pore diameters of 100 to 150 microns.

3. A process for preparing a silver catalyst of high selectivity and productivity for the oxidation of ethylene to ethylene oxide which comprises bonding a plurality of alpha alumina particles having diameters within the range of about 400–600 microns to form pellets having pore diameters of 80–200 microns and porosities of 40–50%, impregnating said pellets with a silver oxide slurry, drying the impregnated pellets, and activating the impregnated pellets by heating at a temperature of about 300–400° C.

4. A process for preparing a silver catalyst of high selectivity and productivity for the oxidation of ethylene to ethylene oxide which comprises bonding a plurality of alpha alumina particles having diameters within the range of about 450–550 microns to form pellets having pore diameters of 100–150 microns and porosities of 40–50%, impregnating said pellets with a silver oxide slurry, drying the impregnated pellets, and activating the impregnated pellets by heating at a temperature of about 300–400° C.

References Cited by the Examiner

UNITED STATES PATENTS

| | | |
|---|---|---|
| 2,831,870 | 4/1958 | McClements et al. __ 252—476 X |
| 2,901,441 | 8/1959 | Waterman _____ 252—463 |
| 2,918,497 | 12/1959 | Walter _____ 252—463 X |
| 2,920,052 | 1/1960 | Martin _____ 252—463 |
| 3,207,700 | 9/1965 | Saffer _____ 252—463 X |

OSCAR R. VERTIZ, *Primary Examiner.*

G. OZAKI, *Assistant Examiner.*